July 27, 1943.  N. L. ALISON  2,325,090
DUMP VALVE FOR HYDRAULIC COUPLINGS
Filed Sept. 24, 1940  4 Sheets-Sheet 1
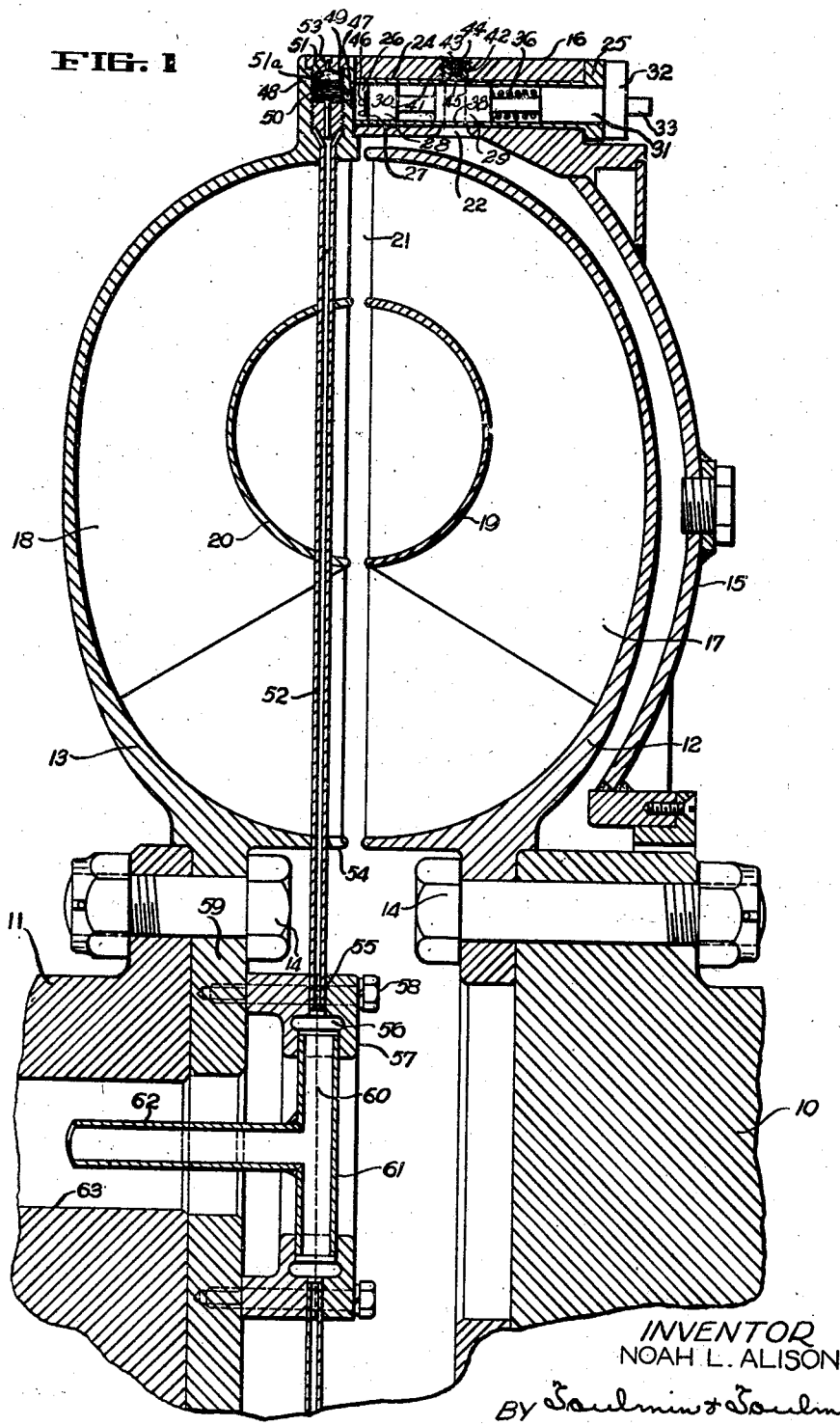
INVENTOR
NOAH L. ALISON
By Toulmin & Toulmin
ATTORNEYS July 27, 1943.　　　N. L. ALISON　　　2,325,090
DUMP VALVE FOR HYDRAULIC COUPLINGS
Filed Sept. 24, 1940　　　4 Sheets-Sheet 2
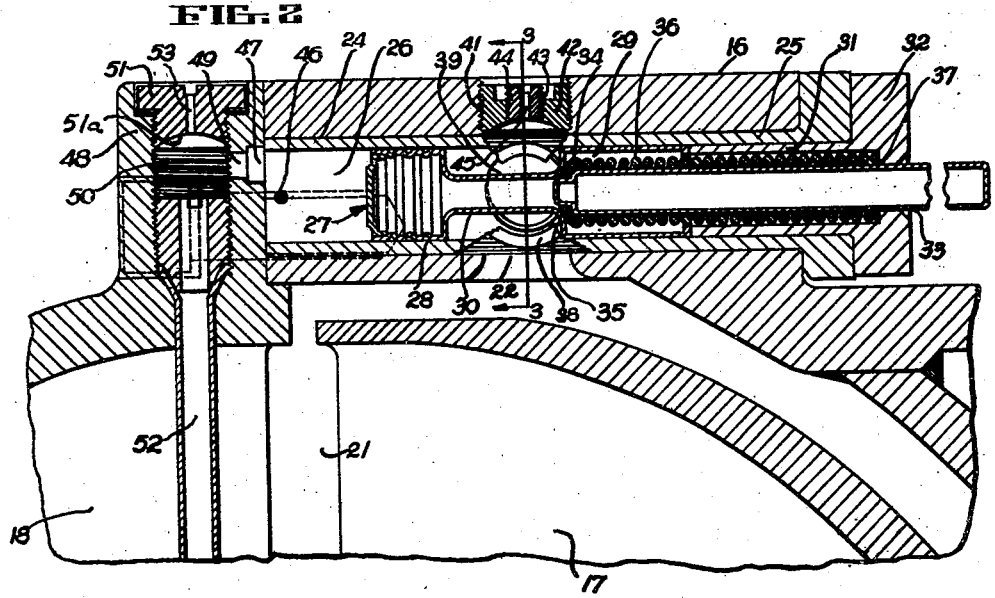
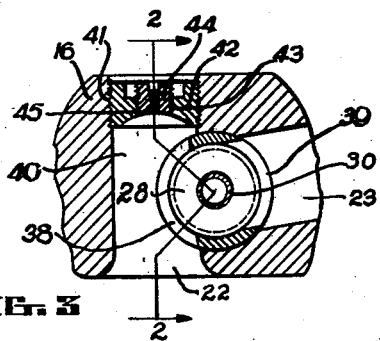
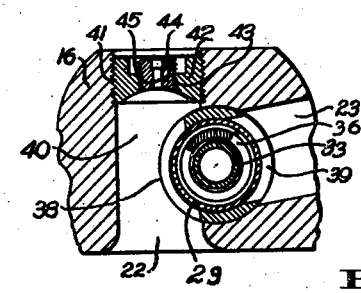
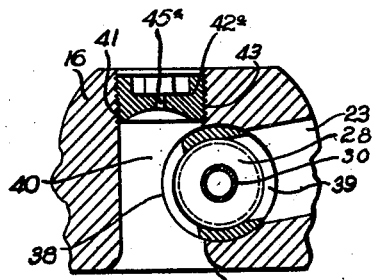
INVENTOR
NOAH L. ALISON
BY Toulmin & Toulmin
ATTORNEYS INVENTOR
NOAH L. ALISON
BY Toulmin & Toulmin
ATTORNEYS July 27, 1943.  N. L. ALISON  2,325,090
DUMP VALVE FOR HYDRAULIC COUPLINGS
Filed Sept. 24, 1940  4 Sheets-Sheet 4

INVENTOR
NOAH L. ALISON
BY Toulmin & Toulmin
ATTORNEYS

Patented July 27, 1943

2,325,090

UNITED STATES PATENT OFFICE 2,325,090

DUMP VALVE FOR HYDRAULIC COUPLINGS

Noah L. Alison, Detroit, Mich., assignor to The American Blower Corporation, Detroit, Mich., a corporation of Delaware Application September 24, 1940, Serial No. 358,144

6 Claims. (Cl. 60—54)

This invention relates to hydraulic couplings, and in particular to means for controlling the actuation of dumping valves for emptying such couplings.

It is an object of the invention to provide a hydraulic coupling having a casing with dumping valves for emptying the casing of working liquid, in which the operation of the dumping valves is not affected by the centrifugal force imparted upon the driving fluid during the operation of the coupling, and is hydraulically counterbalanced against centrifugal force to prevent valve sticking.

It is another object of the invention to provide a hydraulic coupling having a dumping valve including a reciprocable member and a cylinder for controlling the discharge of working fluid from the coupling members, in which undesired dirt particles in the working fluid are prevented from accumulating between the reciprocable member and the cylinder walls engaged thereby by precollection of such foreign material before they can reach said valve.

It is an object of the invention to precollect dirt particles from the oil in the coupling prior to the oil entering into the dumping valve by centrifugal action of the coupling, and to discharge such dirt from the oil line leading to the valve.

It is a further object of the invention to provide a hydraulic coupling comprising a reciprocable plunger for controlling the discharge of working fluid from the coupling members, in which the centrifugal force exerted upon the controlling plunger is, at least in part, hydraulically balanced.

A still further object of the invention consists in the provision of a hydraulic coupling having a reciprocable plunger for controlling the discharge of working fluid from the coupling members, in which working fluid is continuously passed by the controlling plunger during operation of the coupling.

It is still another object of the invention to provide a hydraulic coupling as set forth in the preceding paragraph, in which means is provided for allowing variation of the quantity of fluid passed by the controlling plunger during operation of the coupling.

These and other objects and advantages of the invention will appear more clearly from the following specification in connection with the accompanying drawings, in which:

Figure 1 is a central vertical section, in axial plane, through a hydraulic coupling according to the present invention.

Figure 2 shows the upper portion of Figure 1 on an enlarged scale and is a section along the line 2—2 of Figure 3.

Figure 3 is a section along the line 3—3 of Figure 2.

Figure 4 is a section similar to Figure 3, however with the controlling plunger in closed position.

Figure 5 is a section similar to Figure, 3, showing a slight modification with regard to the latter.

General arrangement

Figure 6:
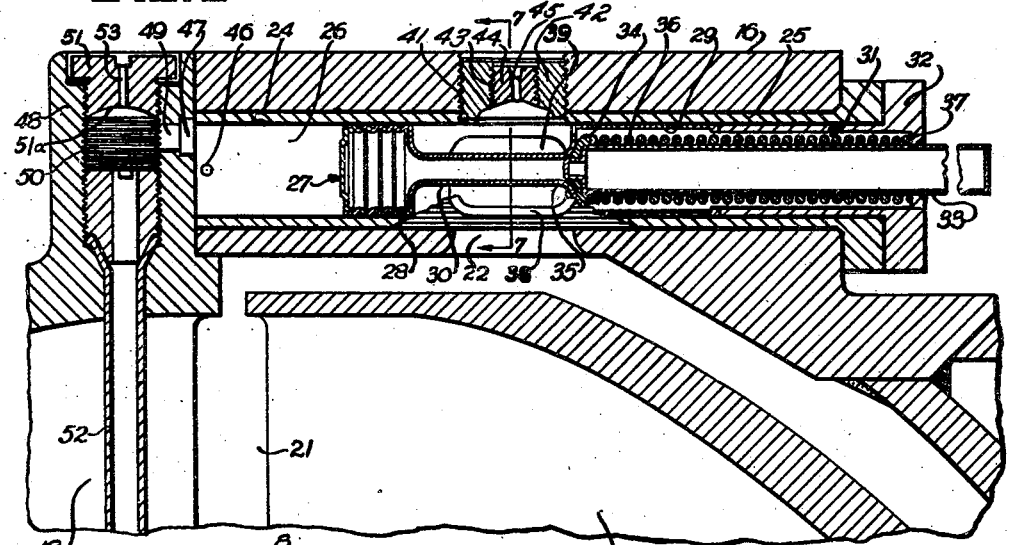
Figure 6 is a view similar to Figure 2, however showing an oval shaped discharge opening.
Figure 7:
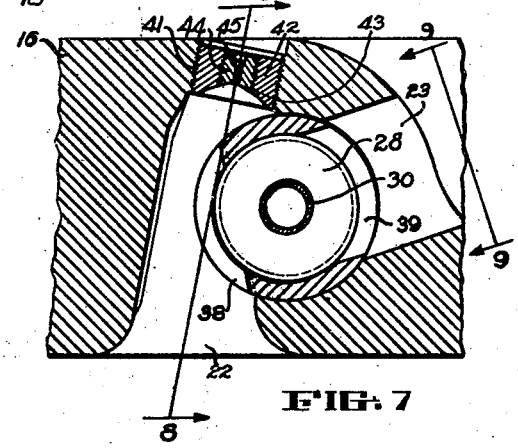
Figure 7 is a section along the line 7—7 of Figure 6.
Figure 8:
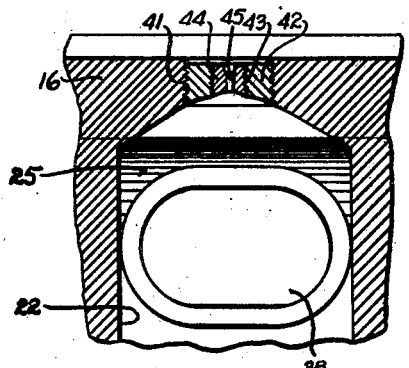
Figure 8 is a section along the line 8—8 of Figure 7.
Figure 9:
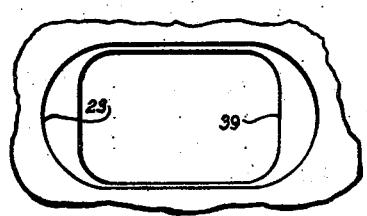
Figure 9 is a view of Figure 7, seen in the direction of the arrows 9—9.
Figure 14:
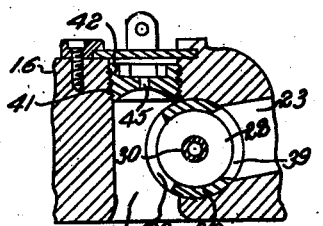
Figure 14 is a section similar to Figure 5, showing a slight modification.
Figure 15:
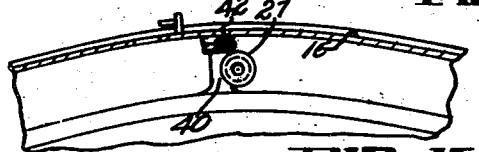
Figure 15 is a partial section taken at right angles to Figure 14 and through the ring valve thereof.

The hydraulic coupling according to the present invention comprises driving and driven shafts with primary and secondary rotors and a casing attached to one of the rotors. The casing is provided with one or more discharge ports having transversely arranged valve bores adjacent these ports. A piston valve member is arranged to be reciprocable in each valve bore to cover and uncover the discharge ports and is continuously urged by spring means in one direction, whereas a fluid source is adapted selectively to move said valve member in the other direction against the thrust of the spring. The primary feature of the present invention consists in that a continuous stream of driving fluid is passing by the controlling plunger for controlling the discharge of working fluid from the coupling members so that any impurities in the driving fluid, when subjected to centrifugal force, will be enabled to pass by said controlling plunger thereby preventing the accumulation of such impurities between vital movable parts of the discharge control valve.

In the principal form of the invention the discharge control valve is normally closed with the plunger over the discharge port. In this form the valve is opened by the pressure fluid, such as compressed air or liquid under pressure, reaching its valve operating chamber from the independent source which is separate from the source of supply of the working liquid.

According to a further embodiment of the invention, working fluid is conveyed to the controlling plunger of the discharge valve so as to exert a pressure on the plunger which, at least in part, balances the centrifugal force exerted on said plunger.

*Structural arrangement*

Referring to the drawings in detail, Figure 1 shows the hydraulic coupling according to the present invention, which comprises driving and driven shafts 10 and 11 having secured thereto a primary rotor or impeller 12 and a secondary rotor or runner 13, for instance by means of bolts 14. Bolted to the secondary rotor 13 is a housing 15 having a peripheral portion 16. The primary and secondary rotors 12 and 13 are provided with blades or vanes 17 and 18 and core rings 19 and 20, respectively, operating in a working chamber 21. The peripheral casing portion 16 is provided with discharge ports 22 and 23 traversed by a transverse bore 24 having a sleeve 25 mounted therein. Reciprocably mounted in the bore 26 of the sleeve 25 is a controlling plunger, generally designated 27, with two spaced piston heads 28 and 29 interconnected by a piston rod 30. The controlling plunger is preferably made hollow and of light material so as to reduce the inertia of the plunger to a minimum. The piston head 29 engages, in its outermost right-hand position, the sleeve portion 31 of a closure member 32 connected with the sleeve 25 in any convenient manner. Passing through the closure member 32 and slidably mounted therein is a tubular support 33 with a head 34 connected thereto, which head is adapted to engage the flanged portion 35 of the controlling plunger 27 and is engaged by one end of a spring 36, the other end of which engages the wall 37 of the closure member 32. The tubular support 33 prevents the coil spring 36 from being thrown out of line at its mid-portion and from interfering with the valve movement which may be caused by the centrifugal force developed when the housing 15 is in rotation.

The sleeve 25 is provided adjacent the port 22 with openings 38 and 39 which, according to the embodiments of Figures 2 to 5, are circular. As will be seen from Figure 3, the opening 38 has its rim portions beveled so that the fluid passing through the port 22 can easily pass the opening 38 to be discharged therethrough. As will furthermore be seen from Figure 3, the opening 38 is so arranged that no accumulation or whirl of fluid can occur at the entrance of said opening. The port 22 communicates with a bore 40 passing through the peripheral portion 16 and having a threaded upper portion 41 engaged by a correspondingly threaded plug 42. According to Figures 2 to 4, the plug 42 has an inner thread 43 engaged by a correspondingly threaded plug 44 with an opening 45 therein.

Figure 10:
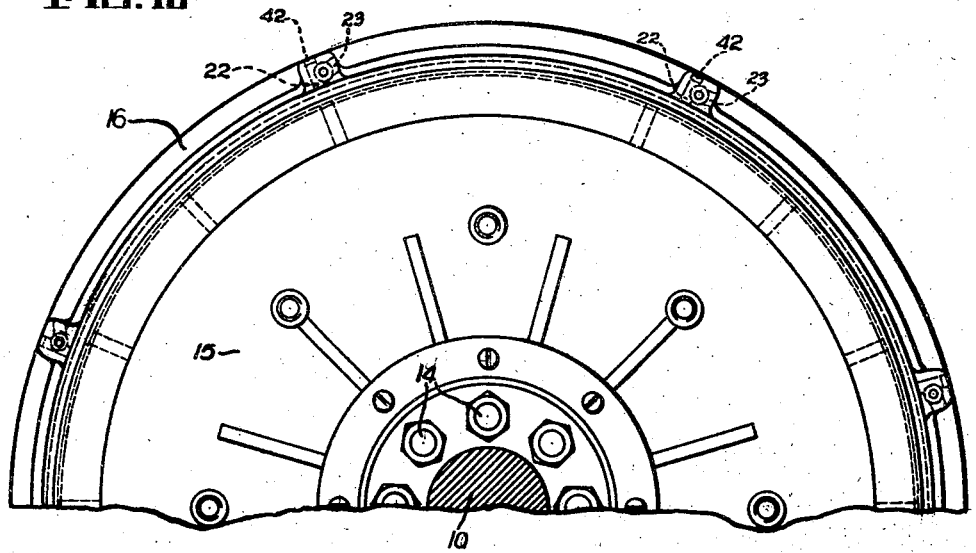
Figure 10 is an end view of the coupling casing showing the arrangement of the discharge bores.

According to the embodiment of Figure 5, the plug 42a has a constant discharge opening 45a in contrast to the embodiment in Figure 3, in which, by removing the plug 44 and replacing the same by another plug, the discharge opening may be varied without exchanging the plug 42. The discharge openings 45 and 45a communicate with an exhaust for instance, with a collector surrounding the coupling. As will be seen from Figures 2 and 3, communication is effected between the interior of the coupling members 12 and 13 and the discharge port 23 when the controlling plunger 27 has reached its outermost right-hand position, in which the piston head 29 engages the sleeve portion 31 of the closure member 32. When the piston head 28 is in its outermost left-hand position in which it engages the pin 46 passing through the sleeve 25, the piston head 29 closes the opening 38, while a limited quantity of working fluid continuously passes through the port 22 by the controlling plunger 27 and discharges through the restricted discharge opening 45. In this way any impurities in the working fluid which will be thrown to the periphery of the coupling members due to the centrifugal force developed during the operation of the coupling may escape through one or more of the restricted discharge openings 45, 45a, thereby preventing accumulation of such impurities between the piston head 29 and the sleeve 25, as was sometimes the case with previous similar constructions, in which the piston head 29 controlled the port 22. Preferably a plurality of valve arrangements, as shown in Figure 2, are provided along the periphery of the coupling housing 15, as is illustrated in Figure 10. As will be seen from Figures 3 to 5 and 7, the edges of opening 38 protrude somewhat beyond the adjacent casing wall portions. This is advantageous inasmuch as it prevents any dirt pocket between the sleeve 25 and the plunger 27.

The bore 26 of each sleeve 25 opens into an annular channel 47 in the flange 48 of the secondary rotor 13. The channel 47 completely encircles the coupling and is connected by the passageways 49 to bores 50. Each of the bores 50 is closed at one end by a threaded plug 51 and has secured in the other end thereof an axially directed conduit 52. The plug 51 comprises a leak port 53 through which fluid may escape into a collecting container and has at its inner surface a dirt collecting pocket 51a.

The conduit 52 passes through the core ring 20 and secondary rotor fin 54 and terminates in a bore 55 leading to an annular chamber 56 within a ring-shaped member 57 connected by bolts 58 to the flanged portion 59 of the secondary rotor 13. It will be understood that the ring-shaped member 57 comprises a plurality of such bores 55 and conduits 52 leading outwardly therefrom. The ring-shaped member 57 is provided with ports 60 opening into the annular chamber 56 and receiving the opposite ends of a cross pipe 61. Connected to the latter is a pipe 62 leading through a bore 63 in the driven shaft 11 to a separate source of pressure fluid, such as compressed gas or liquid under pressure, independent of the supply of the working fluid for the coupling, which working fluid is supplied to the coupling through the shaft bore 63.

The embodiments shown in Figures 6 to 9 are somewhat similar to the embodiments of Figures 2 to 5 and differ therefrom primarily in the shape of the discharge openings 38 and 39.

Figure 11:
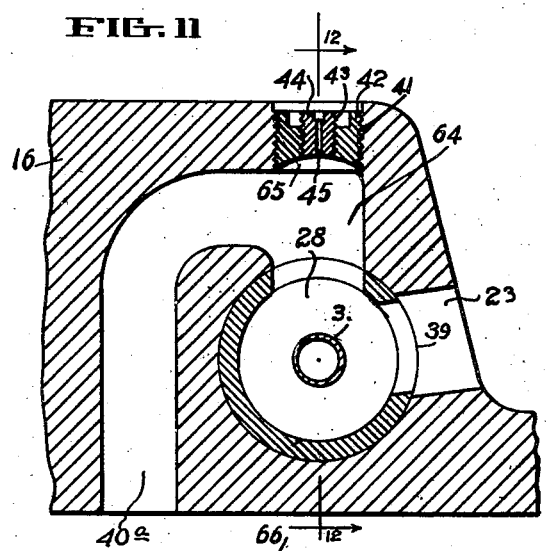
Figure 11 shows a further embodiment of the invention.
Figure 12:
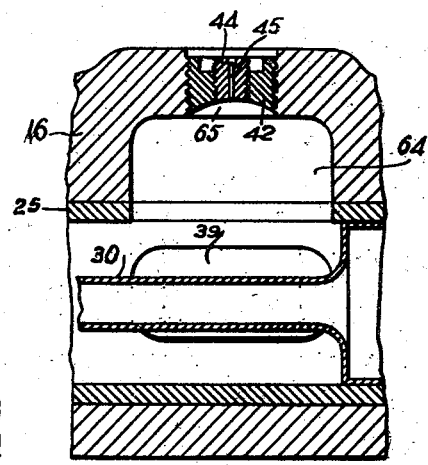
Figure 12 is a section along the line 12—12 of Figure 11.

According to the embodiment of Figure 11, the peripheral portion 16 of the coupling is provided with a discharge passageway 40a which is so constructed that the fluid passing therethrough has to change its direction before it reaches the restricted discharge opening 45. In this way fluid will accumulate in the portion 64 of the discharge passageway 40a due to the centrifugal force developed during the operation of the coupling, so that pressure will develop in the passage portion 64, which pressure will press the controlling plunger 27 toward the interior of the coupling, thereby at least partially counteracting the centrifugal force tending to throw the controlling plunger 27 toward the outside. A portion of the impurities collecting in the pocket 65 adjacent the limited discharge opening 45 will be discharged through the opening 45, while the remaining impurities can easily be removed from the pocket 65 by unthreading the plugs 44 and 42.

Figure 13:
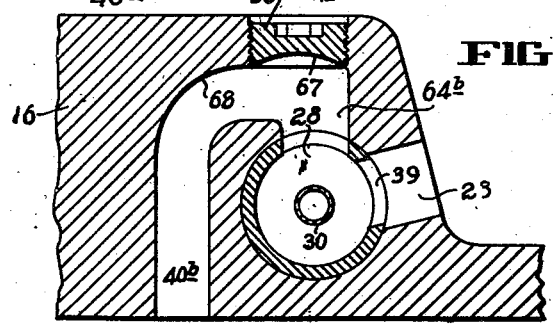
Figure 13 is a section similar to Figure 11 and illustrates a still further embodiment of the invention.

Finally, with regard to Figure 13, the embodiment shown therein is similar to the embodiment of Figure 11 but differs therefrom in that the plug 44 with the restricted discharge opening 45 and the plug 42 are replaced by a single plug 66, the lower surface of which is provided with a large dirt collecting pocket 67. Also in this embodiment a portion of the working fluid will, due to the centrifugal force acting thereupon, cause it to pass through the passageway 40b so that the dirt particles will slide along the surface 68 and be collected in the pocket 67, while pressure will develop in the portion 64b of the passageway 40b and act upon the controlling plunger 27, 35, so as at least in part to counteract the centrifugal force imparted upon the controlling plunger 27, 35, due to the rotation of the housing 15. The plug 66 may from time to time be removed from the housing 15 to discharge the dirt collected in the pocket 67.

*Operation*

In the operation of the construction shown in the drawings, the driving shaft 10 and primary rotor 12 are started in rotation by the starting of the engine, or other prime mover, to which the driving shaft 10 is connected. Working fluid is then supplied from the filling pump (not shown) through the driven shaft bore 63 to the working chamber 21. The plunger valve member 27 is in its normally closed position, shutting off communication between the discharge port 22 and the discharge opening 23. Consequently, the coupling is filled with working fluid so that rotation of the primary rotor 12 is then conveyed to the secondary rotor 13 by the interaction of their blades 17 and 18 upon the working fluid. While the coupling is in operation, a limited quantity of fluid will continuously pass through the discharge port 22, the bore 46 and the restricted discharge openings 45 and 45a.

When it is desired to empty the working chamber 21 of its working liquid and consequently to halt the secondary rotor 13, the operator shifts a valve (not shown) so as to admit pressure fluid, for instance compressed air or a liquid under pressure, to the pipe 62 from a source of supply other than the source of supply of the working fluid used for filling the coupling. The pressure fluid passes from the pipe 62, through the cross pipe 61, into the annular chamber 56 of the ring-shaped member 57, thence outwardly through the conduits 52, the bores 50 and the passageways 49 into the annular channel 47 from where it flows to the bore 26 of the sleeve 25 to act against the end of the valve plunger 27. The thus exerted pressure forces the valve plunger 27 toward the right, against the thrust of the coil spring 36, thereby releasing the discharge openings 38 and 39 and establishing communication between the discharge ports 22 and 23. Due to the influence of centrifugal force, the working liquid is rapidly discharged through the discharge ports 22 and 23, and the secondary rotor 13 halts after the working chamber 21 becomes empty.

To refill the coupling the operator again shifts the control valve, cutting off the supply of pressure fluid to the pipe 62, and connecting the annular channel 47 with an exhaust, thereby releasing the control pressure acting upon the controlling plunger 27. Under the influence of the coil springs 36, each valve plunger 27 then returns to its normally closed position with the valve head 29 closed over the discharge openings 38 and 39. The coupling may now be filled in the manner previously described. Refilling of the couplings is not affected by the continuously open limited discharge openings 45 and 45a since these openings allow only a rather limited discharge and are intended merely for maintaining a continuous flow adjacent the controlling plunger 27 so as to prevent any accumulation of impurities between vital movable portions of the controlling valve plunger and the cylinder portions of the sleeve 25 engaged thereby. However, if desired, any convenient closure means, as for instance a sliding ring with slots therein, may be provided around the restricted openings 45, 45a, which may be shifted so as temporarily to close the restricted discharge openings at the refilling period of the couplings while, when the couplings are filled, the ring is shifted so that the slots therein are in alignment with the restricted openings 45, 45a.

It will be understood that I desire to comprehend within my invention such modifications as come within the scope of the claims.

Having thus fully described my invention, what I claim as new and desire to secure by Letters Patent is:

1. In a hydraulic coupling, a primary rotor, a secondary rotor, said primary rotor being adapted to be connected with a prime mover, means for supplying working fluid to said rotors, a casing surrounding said rotors and having a radially arranged discharge channel therein, a discharge opening in said casing, a reciprocable valve member with spaced piston heads adapted selectively to effect communication between said discharge channel and said discharge opening, means for continuously passing working fluid past said valve member from the inlet portion of the discharge channel, means for holding said valve member closed during operation of said coupling, and means for opening said valve member to effect communication between said radial channel and said discharge opening.

2. In a hydraulic coupling, a primary rotor, a secondary rotor, said primary rotor being adapted to be connected with a prime mover, means for supplying working fluid to said rotors, a casing enclosing said rotors and having a radially arranged discharge passageway therein with a restricted discharge opening adjacent the periphery of said casing, a valve bore substantially at right angles to said discharge passageway and adapted directly to communicate with the latter, said passageway being laterally offset with respect to said valve bore for causing particles in said working fluid and heavier than the latter to pass by said valve bore and to said discharge opening, a discharge port in said casing for a fast discharge of working fluid from said rotors, and a dumping valve arranged in said valve bore and adapted selectively to effect communication between said discharge passageway and said discharge port.

3. In a hydraulic coupling, a primary rotor, a secondary rotor, means for supplying working fluid to said rotors, a casing enclosing said rotors and having a discharge port, a discharge passageway in said casing having a substantially radial portion in continuous communication with said rotors and an angular portion connecting said substantially radial portion with said discharge port, valve means in said angular portion for controlling communication between said discharge passageway and said discharge port, and choke means continuously connecting the radially outermost portion of said discharge passageway with an exhaust.

4. In a hydraulic coupling, a primary rotor, a secondary rotor, means for supplying working fluid to said rotors, a casing enclosing said rotors and having a discharge passageway radially arranged therein and in continuous communication with the interior of said rotors, a valve bore having a first opening therein continuously communicating with said passageway, and a second opening arranged in alignment with said first opening and communicating with an exhaust, the rim portions of said first opening being beveled, said valve bore being transverse to said discharge passageway but axially offset with regard thereto, a plunger reciprocably mounted in said valve bore for controlling communication between said second opening and said passageway, a restricted fluid outlet continuously communicating with said discharge passageway for continuously discharging a restricted quantity of working fluid from said rotors, and conduit means for selectively conveying pressure fluid to said plunger to actuate the same.

5. In a hydraulic coupling, primary and secondary rotors, means for supplying working fluid to said rotors, a casing associated with said rotors, a dumping valve in said casing adapted, in open position, to effect a fast discharge of working fluid from said rotors, conduit means provided in said casing and continuously hydraulically connecting said rotors with said dumping valve, and a member connected to said casing and detachable therefrom independent of said dumping valve for allowing a limited quantity of fluid to escape from said rotors while the latter are being rotated, said member being offset with regard to said dumping valve and being provided with a chamber communicating with said conduit means at a point located between said rotors and said valve at a distance from the axis of rotation of said rotors greater than the distance between said valve and said axis, whereby foreign material in said working fluid is collected in said chamber before said working fluid reaches said dumping valve.

6. In a hydraulic coupling, a primary rotor, a secondary rotor, means for supplying working fluid to said rotors, a casing surrounding said rotors and including a restricted normally open passageway for conveying working fluid to an exhaust, a sleeve extending into said passageway and having an opening with its rim portions protruding beyond adjacent wall portions of said passageway, an exhaust port in said sleeve, and a dumping piston slidably mounted in said sleeve and operable selectively to open or close said opening.

NOAH L. ALISON.